United States Patent [19]

Konno et al.

[11] Patent Number: 4,703,655
[45] Date of Patent: Nov. 3, 1987

[54] GYRO APPARATUS

[75] Inventors: Masashi Konno, Yonezawa; Takeshi Hojo; Kazuteru Sato, both of Kuroiso, all of Japan

[73] Assignee: Kabushiki Kaisha Tokyo Keiki, Tokyo, Japan

[21] Appl. No.: 894,869

[22] Filed: Aug. 8, 1986

[30] Foreign Application Priority Data

Aug. 13, 1985 [JP] Japan ................................ 60-178202

[51] Int. Cl.$^4$ .............................................. G01P 9/04
[52] U.S. Cl. ..................................................... 73/505
[58] Field of Search .................... 73/505; 310/329, 370

[56] References Cited

U.S. PATENT DOCUMENTS

| | | | |
|---|---|---|---|
| 3,839,915 | 10/1974 | Schlitt | 73/505 |
| 4,538,461 | 9/1985 | Juptner et al. | 73/505 |
| 4,653,325 | 3/1987 | Hojo et al. | 73/505 |

Primary Examiner—John Chapman
Attorney, Agent, or Firm—Hill, Van Santen, Steadman & Simpson

[57] ABSTRACT

A gyro apparatus having a tuning fork and a detecting portion for detecting the moment generated by Coriolis force in the tuning fork is disclosed, in which the detecting portion is formed of a rectangular-shaped hinge, a base portion to which both ends of the rectangular-shaped hinge are fixed and a pair of detection piezo-electric elements fixed to the rectangular-shaped hinge spaced apart from each other in its up and down direction and in which the tuning fork is fixed to the central portion of the rectangular-shaped hinge between the pair of detection piezo-electric elements such that the tuning fork axis becomes substantially perpendicular to the longitudinal direction of the rectangular-shaped hinge portion and parallel to the plane of the rectangular-shaped hinge and the center of mass of the tuning fork coincides with the center of the rectangular-shaped hinge.

6 Claims, 4 Drawing Figures

GYRO APPARATUS

BACKGROUND OF THE INVENTION

1. Field of the Invention

This invention relates generally to a gyro apparatus (angular velocity detecting apparatus) and, more particularly, is directed to a gyro apparatus employing a tuning fork.

2. Description of the Prior Art

An example of a prior art tuning fork-type gyro apparatus will be described first with reference to FIG. 1. FIG. 1 is a perspective view of such a prior art tuning fork-type gyro apparatus. In this tuning fork-type gyro apparatus shown in FIG. 1, a tuning fork 1 is attached to a base table 2 through a flexible shaft 3. To the tuning fork 1 at its positions near the upper end thereof, there are mounted displacement detectors 6 and drive windings 4 respectively, and the outputs from the displacement detectors 6 are supplied together through a drive amplifier 5 to the drive windings 4 whereby to keep the vibration amplitude of the tuning fork 1 constant. If an angular velocity $\Omega$ is applied around the axis of the flexible shaft 3 of the tuning fork 1, that is, an input axis or a tuning fork axis Z—Z, there are respectively generated Coriolis forces Fc which correspond to a vibration speed v of the tuning fork 1 and the input angular velocity $\Omega$ and which Coriolis forces Fc are parallel to each other but opposite in direction. By the Coriolis forces Fc, the whole of the tuning fork 1 is rotated around the input axis Z—Z in an AC fashion. In other words, a twisting vibration is generated in the tuning fork 1.

In the prior art example shown in FIG. 1, the twisting vibration of the tuning fork 1 is detected by a twising detector 8 mounted on the base portion of the tuning fork 1 and the detected output from the detector 8 and the output from the drive amplifier 5 are synchronously rectified by a demodulator 7 to thereby detect the input angular velocity $\Omega$, thus a gyro apparatus being constructed.

However, according to such a prior art tuning fork-type (or vibration-type) gyro apparatus, the heavy-weighted tuning fork 1 is supported in a cantilever fashion so that the load capacity of the flexible shaft 3 must be made sufficiently large. This causes the flexible shaft portion 3 to become large in size. Further, since the Coriolis force Fc corresponding to the input angular velocity $\Omega$ is derived as a rotation angle of the tuning fork 1 having a large moment of inertia, the sensitivity for the input angular velocity $\Omega$ is low. If this sensitivity is increased, the whole of the gyro apparatus becomes large in size. Furthermore, since the flexible shaft 3 and the twisting detector 8 are formed of separate members, there are problems, for example, that the construction of the gyro apparatus becomes complicated, also the detection sensitivity for the input angular velocity $\Omega$ is low and so on.

OBJECTS AND SUMMARY OF THE INVENTION

Accordingly, it is an object of this invention to provide an improved tuning fork-type gyro apparatus.

It is another object of this invention to provide an improved tuning fork-type gyro apparatus which can be made small in size on the whole.

It is still another object of this invention to provide an improved gyro apparatus which can increase the detection sensitivity.

It is further object of this invention to provide an improved tuning fork-type gyro apparatus which can remove the influence of the acceleration applied thereto in the direction perpendicular to its vibration axis.

It is still further object of this invention to provide an improved tuning fork-type gyro apparatus which can improve its efficiency as a gyro.

It is yet further object of this invention to provide an improved tuning fork-type gyro apparatus which can be manufactured with ease and at low cost.

According to one aspect of the present invention, there is provided a gyro apparatus comprising:

(a) a tuning fork; and (b) a detecting portion for detecting the moment generated by Coriolis force generated in said tuning fork, the detecting portion being formed of:

(c) a rectangular-shaped hinge having a pair of rectangular-shaped hinge portions;

(d) a base portion to which both ends of the rectangular-shaped hinge are fixed; and (e) a pair of detection piezo-electric elements fixed to the pair of rectangular-shaped hinge portions so as to be spaced apart from each other in the vertical direction, the tuning fork being fixed to the central portion of the rectangular-shaped hinge between the pair of detection piezo-electric elements such that a tuning fork axis of the tuning fork becomes substantially perpendicular to the longitudinal direction of the rectangular-shaped hinge and parallel to the plane of the rectangular-shaped hinge and the center of mass of the tuning fork coinciding with the center of the rectangular-shaped hinge.

These and other objects, features and advantages of the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

The present invention will now be described in detail hereinafter with reference to the attached drawings.

Figure 1:
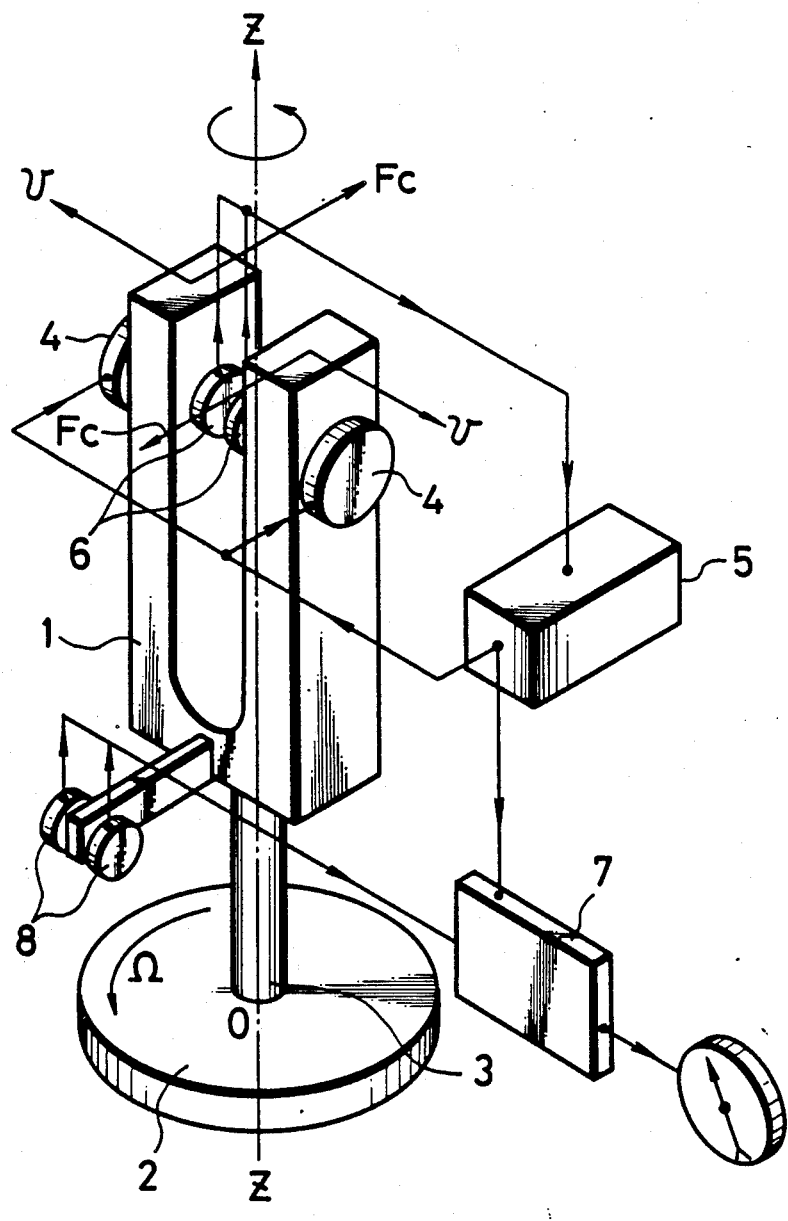
FIG. 1 is a perspective view showing an example of a prior art gyro apparatus.
Figure 2:
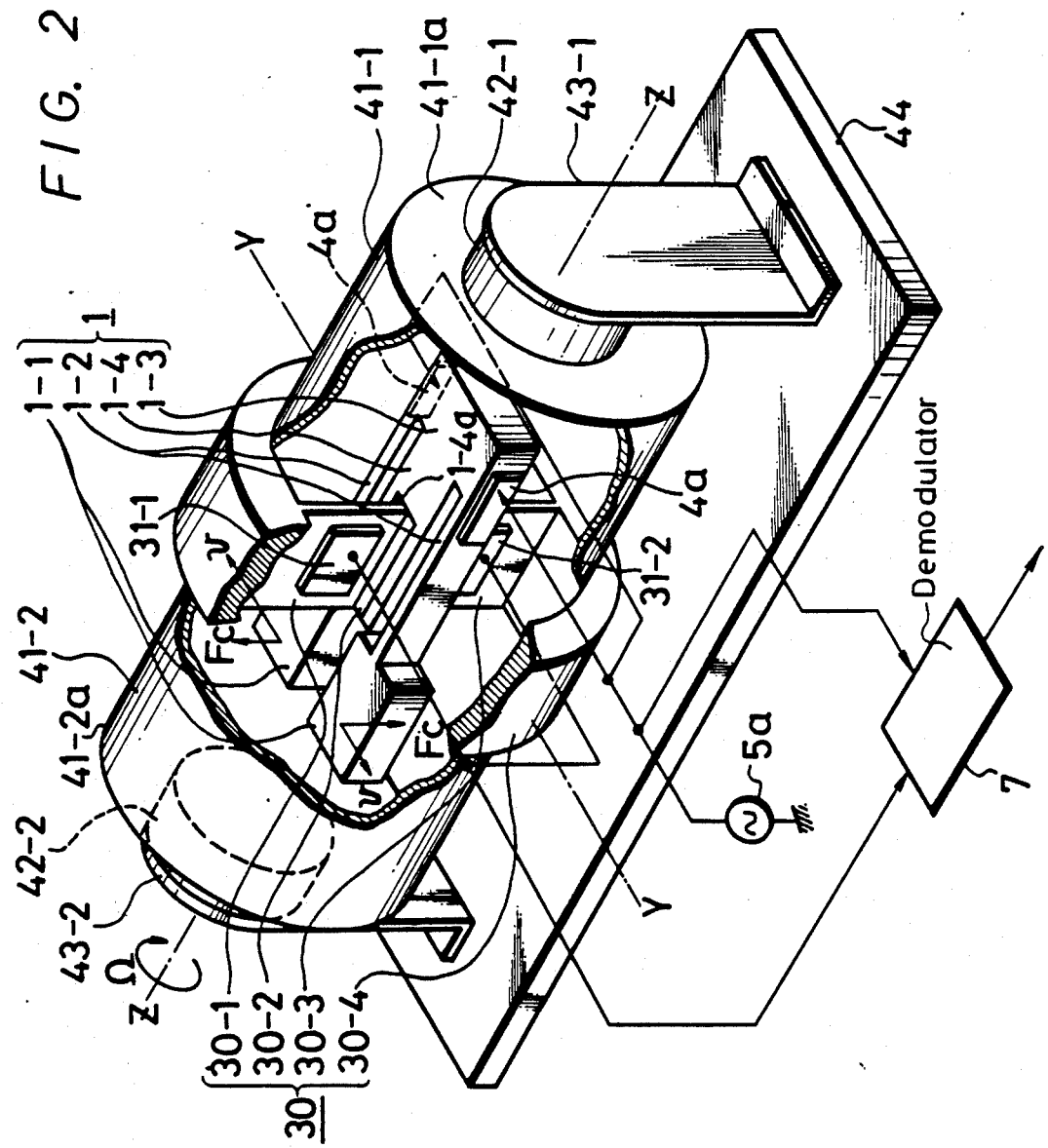
FIG. 2 is a partially cut-away perspective view illustrating one embodiment of a gyro apparatus according to this invention.

FIG. 2 is a partially cut-away perspective view showing one embodiment of a tuning fork-type gyro apparatus according to the present invention. In FIG. 2, like parts corresponding to those of FIG. 1 are marked with the same references and will not be described in detail.

In the embodiment of the present invention shown in FIG. 2, the tuning fork 1 is formed of vibration mass portions 1-1, each having a large mass, flexible portions 1-2 coupled to the respective vibration mass portions 1-1, a base portion 1-3 to couple the free ends of both the flexible portions 1-2, and a coupling portion 1-4 extending from the base portion 1-3 to the spacing or clearance formed between both the flexible portions 1-2 without contacting them.

Reference numeral 30 designates a hinge. This hinge 30 is formed of a central coupling portion 30-2, rectangular-shaped hinge portions 30-1 and 30-3 which are respectively extended from the central coupling portion 30-2 up and down and a base portion or an annular portion 30-4 to integrally couple or to connect the free ends of the two hinge portions 30-1 and 30-3. In this case, it is preferable that the hinge 30 be formed from a single board on the whole by a wire cut method and the like. To the rectangular-shaped hinge portions 30-1 and 30-3, there are respectively fixed a pair of piezo-electric elements 31-1 and 31-2 which are used to detect the deformation or flexure generated in the hinge 30 by the angular velocity $\Omega$ applied around the input axis Z—Z of the tuning fork 1. The coupling portion 30-2 of the hinge 30 is engaged with a U-shaped concave portion 1-4a formed in the coupling portion 1-4 of the tuning fork 1.

To both open ends of the base portion, that is, the annular portion 30-4 of the hinge 30, there are respectively fixed in air-tight fashion open portions of cylindrical members 41-1 and 41-2 whose one ends are closed and which are substantially same in shape and in dimension. In this case, the tubular axes of the annular portion 30-4 and both the cylindrical members 41-1 and 41-2 are arranged to coincide with the tuning fork axis or the input axis Z—Z, respectively. Closed ends 41-1a and 41-2a of the respective cylindrical members 41-1 and 41-2 are fixed through cylindrical-shaped elastic members 42-1 and 42-2 to the upper end portions of L-shaped metal members 43-1 and 43-2 the lower end portions of which are respectively fixed to a attaching base table 44. Needless to say, in the above mentioned arrangement, the respective portions of the tuning fork 1 are designed such that the center of gravity of the tuning fork 1 may coincide with the center of both the hinge portions 30-1 and 30-3 of the hinge 30, that is, the center of the coupling portion 30-2.

Figure 3:
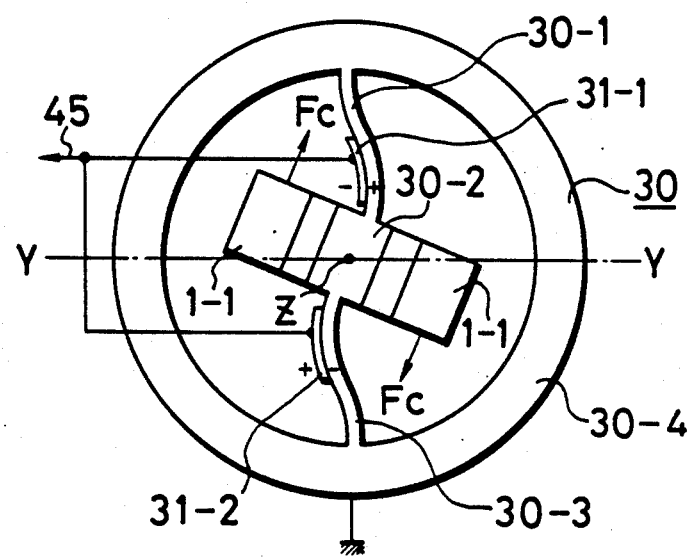
FIG. 3 is a schematic diagram used to explain the principle of the embodiment of the present invention shown in FIG. 2.

FIG. 3 is an explanatory diagram used to explain the principle of the embodiment of the present invention shown in FIG. 2. FIG. 3 illustrates a main portion of the tuning fork-type gyro apparatus viewed from the Z—Z axis direction in FIG. 2. As FIG. 3 shows, when the angular velocity $\Omega$ is applied around the input axis Z—Z of the gyro apparatus, the Coriolis forces Fc corresponding thereto are generated in both the vibration mass portions 1-1 and 1-1 which are parallel to each other but opposite in direction. Then, the torque caused by the Coriolis forces Fc generates through the coupling portion 30-2 of the hinge 30 an S-shaped deformation or flexure in each of the hinge portions 30-1 and 30-2 as shown in FIG. 3. In this case, since the piezo-electric elements 31-1 and 31-2 are respectively fixed to the hinge portions 30-1 and 30-3 such that their polarity directions become opposite to each other as shown by signs + and − in FIG. 3, if both the piezo-electric elements 31-1 and 31-2 are short-circuited as one output 45 and then the output 45 is synchronously rectified or demodulated with the reference voltage from a voltage source 5a (FIG. 2) by the demodulator 7, it is possible to detect the input angular velocity $\Omega$. Hence, it is possible to provide the gyro apparatus.

Though not shown, if an acceleration is applied to the gyro apparatus in an Y—Y axis direction perpendicular to the input axis Z—Z, the voltages induced in the piezo-electric elements 31-1 and 31-2 become opposite to each other in polarity so that no output is generated therefrom.

Further, in order to avoid the influence of the temperature, it is preferable that the tuning fork 1 and the hinge 30 be made of, for example, constant modulus alloy having zero thermo-elastic coefficient (TEC).

Furthermore, in order to increase the detection sensitiviy, it is preferable that the resonant frequency of the tuning fork 1 and the free angular resonant frequency around the input axis Z—Z, which is determined by the moment of inertia around the input axis Z—Z of the tuning fork 1, the torque spring constant around the input axis Z—Z of the hinge portions 30-1 and 30-3 and the moment of inertia of the annular portion 30-4 and the cylindrical members 41-1 and 41-2, are selected to be substantially equal value. In addition, in the embodiment of the present invention shown in FIG. 2, instead of the drive windings 4 used in the prior art example shown in FIG. 1, driving piezo-electric elements 4a are respectively fixed to the portions overlying from both sides of the base portion 1-3 of the tuning fork 1 to the coupling portions of the respective flexible portions 1-2 and 1-2, these piezo-electric elements 4a are driven by the voltage from the voltage source 5a and this voltage and the output voltages from the piezo-electric elements 31-1 and 31-2 are demodulated by the demodulator 7 to thereby obtain the input angular velocity, thus the gyro apparatus being constructed.

Figure 4:
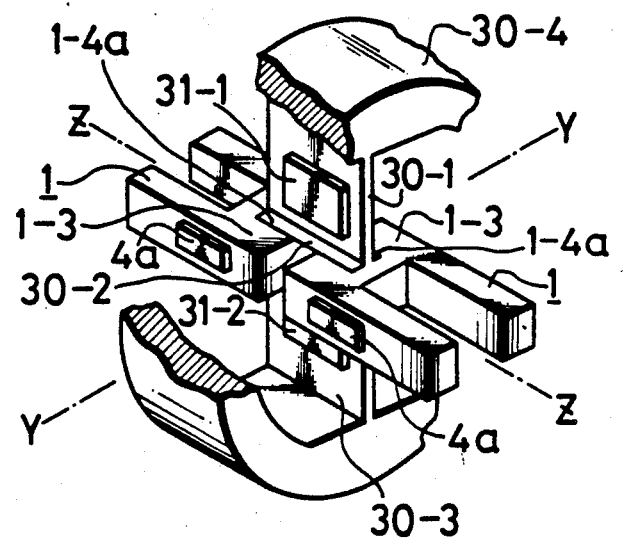
FIG. 4 is a perspective view of a main portion of another embodiment of the present invention.

FIG. 4 is a partially cut-away perspective view showing a main part of another embodiment of the tuning fork-type gyro apparatus according to this invention. In FIG. 4, like parts corresponding to those of FIG. 2 are marked with the same references and will not be described in detail. The second embodiment shown in FIG. 4 and the first embodiment shown in FIG. 2 mainly differ from each other in the fact that two tuning forks 1 and 1 are used in the second embodiment shown in FIG. 4. Specifically, U-shaped concave portions 1-4a are respectively formed in the base portions 1-3 of the same tuning forks 1-1 and the coupling portion 30-2 of the single hinge 30 is engaged with these concave portions 1-4a whereby both the tuning forks 1-1 are fixed to the single hinge 30. In this case, as shown in FIG. 4, the respective tuning forks 1 are disposed such that their tuning fork axes coincide with the input axis Z—Z and that they become symmetrical with each other relative to both of the input axis Z—Z and the axis Y—Y which is perpendicular to the input axis Z—Z. Other arrangements though not shown are made similar to those in the first embodiment shown in FIG. 2 and the operations are substantially the same as those of the first embodiment so that the explanations thereof will be omitted.

The gyro apparatus of the invention can achieve the following effects. Since the flexible shaft 3 and the twisting detector 8 in the prior art example shown in FIG. 1 can be realized by the hinge portions 30-1 and 30-3, each being a simple in construction, and the detection piezo-electric elements 31-1 and 31-2 and also the tuning fork 1 is supported by the coupling portion 30-2 of the hinge 30 at the center of gravity in the tuning fork axis Z—Z direction, unlike the cantilever fashion tuning fork used in the prior art example, the whole arrangement of the gyro apparatus can be made small in size and the strength of the detection piezo-electric elements 31-1 and 31-2 can be suppressed to be low, so the detection sensitivity can be increased.

Further, according to the present invention, since the tuning fork 1 is supported by the central coupling portion 30-2 of the two hinge portions 30-1 and 30-3 which are vertically symmetrical, the detection piezo-electric elements 31-1 and 31-2 are attached to the respective hinge portions 30-1 and 30-3 and their outputs are derived therefrom in a differential fashion, paticularly, it is possible to remove the influence of the acceleration in the direction perpendicular to the plane of the hinge 30, that is, the direction of the axis Y—Y.

Furthermore, according to the present invention, since the hinge 30 formed of the hinge portions 30-1 and 30-3, the coupling portion 30-2 and the annular portion 30-4 is integrally formed by the wire cut method or the like and also in the coupling portion 30-2, the hinge 30 is coupled and fixed to the tuning fork 1 which is formed integrally by the similar wire cut method and so on, it is possible to minimize the coupling portion. Thus, it becomes possible to improve the property of the gyro apparatus of the invention. Also, it becomes possible to manufacture the gyro apparatus with ease and at low cost.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. A gyro apparatus comprising:
    (a) a tuning fork; and
    (b) a detecting portion for detecting moment generated by Coriolis force generated in said tuning fork, said detecting portion being formed of:
    (c) a rectangular-shaped hinge having a pair of rectangular-shaped hinge portions and a coupling portion;
    (d) a base portion to which both ends of said rectangular-shaped hinge are fixed; and
    (e) a pair of detection piezo-electric elements, each fixed to one of said pair of rectangular-shaped hinge portions so as to be spaced apart from each other in the longitudinal direction of said hinge, said tuning fork being fixed to the central portion of said rectangular-shaped hinge between said pair of detection piezo-electric elements such that a tuning fork axis of said tuning fork becomes substantially perpendicular to the longitudinal direction of said rectangular-shaped hinge and parallel to the plane of said rectangular-shaped hinge and the center of mass of said tuning fork coinciding with the center of said rectangular-shaped hinge.

2. A gyro apparatus as claimed in claim 1, in which said tuning fork is formed of two tuning forks which are substantially similar in shape and are fixed to said coupling portion of the hinge symmetrical with respect to the longitudinal axis perpendicular to the tuning fork axis at the center of the hinge.

3. A gyro apparatus according to claim 1, in which said base portion comprises a ring member to which both ends of said hinge are respectively fixed.

4. A gyro apparatus according to claim 3 further comprising a pair of cylindrical members having a closed and an open end, and whose open ends are respectively fixed to said ring member to accomodate therein said tuning fork.

5. A gyro apparatus according to claim 4 further comprising supporting means planted on a base plate for resiliently and symmetrically supporting said pair of cylindrical members around the tuning fork axis.

6. A gyro apparatus as claimed in claim 1, in which the resonant frequency of said tuning fork and the free angular resonant frequency around the input axis of said tuning fork, which is determined by the moment of inertia around the input axis of said tuning fork and the torque spring constant around the input axis of the hinge portions are selected to be of substantially equal value.

* * * * *